US012784334B2

(12) United States Patent
Wang et al.

(10) Patent No.: US 12,784,334 B2
(45) Date of Patent: Nov. 3, 2026

(54) WAVE FIELD RECONSTRUCTION METHOD BASED ON OPTICAL PERCEPTION

(71) Applicant: SHANGHAI JIAO TONG UNIVERSITY, Shanghai (CN)

(72) Inventors: Hongdong Wang, Shanghai (CN); Xinde Yang, Shanghai (CN); Lei Dong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 105 days.

(21) Appl. No.: 19/055,483

(22) Filed: Feb. 17, 2025

(65) Prior Publication Data

US 2025/0191284 A1 Jun. 12, 2025

Related U.S. Application Data

(63) Continuation of application No. PCT/CN2023/126753, filed on Oct. 26, 2023.

(30) Foreign Application Priority Data

Jan. 19, 2023 (CN) ........................ 202310061919.0

(51) Int. Cl.
*G06T 15/50* (2011.01)
*G06T 7/50* (2017.01)
*G06T 15/20* (2011.01)

(52) U.S. Cl.
CPC .............. *G06T 15/506* (2013.01); *G06T 7/50* (2017.01); *G06T 15/205* (2013.01); (Continued)

(58) Field of Classification Search
None
See application file for complete search history.

(56) References Cited

U.S. PATENT DOCUMENTS

2019/0266712 A1* 8/2019 Chirayath ................. G06T 5/50
2022/0155069 A1 5/2022 Previsic et al.
2024/0193904 A1* 6/2024 Marano ................... B63B 43/18

FOREIGN PATENT DOCUMENTS

CN 111292418 6/2020
CN 114677531 6/2022
(Continued)

*Primary Examiner* — Nurun Flora
(74) *Attorney, Agent, or Firm* — JCIPRNET

(57) ABSTRACT

This invention discloses a wave field reconstruction method via optical perception, including: (1) building a data platform for a virtual wave field; (2) pre-training a domain converter module using color image data of the virtual wave field and real water surface image data captured by a camera; (3) pre-training a depth estimation module using generated paired color image data and depth image data of the virtual wave field; (4) converting the style of a real water surface image into a virtual-water-surface-style image via the domain converter module; (5) outputting the virtual-water-surface-style image as a depth image with the same style and recording the distance between a wave surface sampling point and the camera's optical center; and (6) generating surface point cloud data of a water surface wave field with the camera's optical center as the coordinate origin. The method enables real-time, robust wave field depth reconstruction, ensuring reliability and authenticity.

5 Claims, 8 Drawing Sheets

(52) U.S. Cl.
CPC ............... *G06T 2207/10024* (2013.01); *G06T 2207/10028* (2013.01); *G06T 2207/20081* (2013.01); *G06T 2210/24* (2013.01); *G06T 2210/56* (2013.01)

(56) References Cited

FOREIGN PATENT DOCUMENTS

| | | | | | |
|---|---|---|---|---|---|
| CN | 114677531 | A | * | 6/2022 | ............. G06F 18/23 |
| CN | 115937435 | | | 4/2023 | |
| CN | 119810041 | A | * | 4/2025 | |
| CN | 121211393 | A | * | 12/2025 | |

* cited by examiner

WAVE FIELD RECONSTRUCTION METHOD BASED ON OPTICAL PERCEPTION

CROSS-REFERENCE TO RELATED APPLICATION

This application is a national stage of International Application No. PCT/CN2023/126753, filed on Oct. 26, 2023, which claims priority to Chinese Patent Application No. 202310061919.0, filed on Jan. 19, 2023. Both of the aforementioned applications are hereby incorporated by reference in their entireties.

BACKGROUND

Technical Field

The present invention relates to the technical field of reconstruction and rebuilding for three-dimensional wave fields, and specifically relates to a wave field reconstruction method based on optical perception.

Description of Related Art

With development and application of artificial intelligence technology in the field of equipment, intelligent systems of unmanned boats are also experiencing a wave of intelligence. Being different from unmanned vehicles and unmanned aerial vehicles, unmanned boats face complex and ever-changing water surface environments, and due to a lack of perception for surrounding water surface and sea conditions, traditional unmanned boat movement control is very limited in accuracy, and it is difficult to control unmanned boats to complete tasks with high movement accuracy requirements.

In the related fields of fluid research, previous research on a wave field reconstruction technology is mainly carried out from three aspects, the first aspect is carrying out special treatment on a water body, the water body is dyed by means of a fluorescent substance, water surface reconstruction is carried out through analyzing fluorescence intensity of different areas in a captured image, or known image textures are pasted under the transparent water body, a relationship between texture distortion and a water surface shape is analyzed on the basis of the refraction principle, and the method is only suitable for being carried out in a laboratory; the second aspect is capturing an image of a sea surface by means of a camera, and numerical calculation is carried out in combination with physical equations during calculation, however, the calculation amount is too large, the calculation time is long, and an effect of real-time reconstruction cannot be achieved; and the third aspect is reconstructing a wave field by means of an SFS algorithm, however, a wave reconstruction algorithm based on the SFS algorithm does not change an assumption of orthogonal projection, so that a problem of projection occlusion of the wave field cannot be greatly solved.

SUMMARY

With regard to the above condition, the present invention provides a wave field reconstruction method based on optical perception, and the reconstruction method can intuitively represent wave information of a water surface wave field; real-time reconstruction for depth information of the water surface wave field can be realized through capturing a water surface image with a camera, and a high calculation speed is achieved; there are no special requirements on a water body, and high adaptability is achieved; and a problem of projection occlusion of the wave field is considered, so that reliability and authenticity of wave field reconstruction are ensured.

A specific technical solution of the present invention is a wave field reconstruction method based on optical perception, and the wave field reconstruction method based on the optical perception includes the following steps:

- step 1, building a data generation platform for a virtual wave field, simulating optical features of a water surface through using composite illumination models, and generating paired color image data and depth image data of the virtual wave field;
- step 2, constructing a domain converter module, and pre-training the constructed domain converter module through taking the color image data of the virtual wave field, and real water surface image data captured by a camera as a training set;
- step 3: constructing a depth estimation module, and pre-training the constructed depth estimation module through taking the generated paired color image data and depth image data of the virtual wave field as a training set;
- step 4: capturing a real water surface image, and converting a style of the real water surface image into an image with a virtual-water-surface style through using the domain converter module pre-trained in the step 2;
- step 5, outputting the image with the virtual-water-surface style as a depth image with the virtual-water-surface style and recording a distance between a wave surface sampling point and an optical center of the camera through using the depth estimation module; and
- step 6: carrying out coordinate mapping on the depth image with the virtual-water-surface style through adopting a point cloud mapping algorithm, and generating surface point cloud data that takes the optical center of the camera as a coordinate origin, of a water surface wave field.

Further, the data generation platform for the virtual wave field in the step 1 is built through adopting a Gerstner wave model, and the Gerstner wave model is shown in a formula (I) below, $$\begin{cases} x = x_0 + \sum_{i=1}^{n} Q_i\cos\theta_i A_i\sin[k_i(x_0\cos\theta_i + y_0\sin\theta_i) + \omega_i t + \varphi_i] \\ y = y_0 + \sum_{i=1}^{n} Q_i\sin\theta_i A_i\sin[k_i(x_0\cos\theta_i + y_0\sin\theta_i) + \omega_i t + \varphi_i] \\ z = z_0 + \sum_{i=1}^{n} A_i\cos[k_i(x_0\cos\theta_i + y_0\sin\theta_i) + \omega_i t + \varphi_i] \end{cases} \tag{I}$$

wherein t is time, (x, y, z) is a position at the time t, ($x_0$, $y_0$, $z_0$) is a position at rest, $Q_i$ is a sharpness degree of a wave peak of the ith wave superposed, and has a value range of $$[0, \frac{1}{k_i A_i}],$$

$A_i$ is an amplitude of the ith wave superposed, $k_i$ is a wave number of the ith wave superposed, $\theta_i$ is a direction angle of the ith wave superposed, $\omega_i$ is an angular speed of the ith wave superposed, and $\varphi_i$ is an initial phase of the ith wave superposed.

Further, the composite illumination models in the step 1 are a diffuse reflection model, a specular reflection model, and a sub-surface scattering model which are shown in a formula (II), a formula (III), and a formula (IV) below respectively, $$I_d = k_d I_{in} \cos\alpha \tag{II}$$

wherein $I_d$ is observed color brightness, $k_d$ is a diffuse reflectance coefficient, $I_{in}$ is brightness of incident light, and α is an included angle between a plane normal and the incident light;

$$I_m = k_m I_{in} (\cos(\phi - \theta))^n \tag{III}$$

wherein $I_m$ is observed color brightness, $k_m$ is a specular reflection coefficient, $I_{in}$ is the brightness of the incident light, ϕ is an included angle between the plane normal and the incident light, θ is an included angle between the plane normal and an observation line of sight, and n is a highlight coefficient; and $$\begin{cases} L_o(p_o, r_o) = \int\int S(p_o, r_o, p_i, r_i) L_i(p_i, r_i) |\cos\varphi_i| dr_i dA \\ S(p_o, r_o, p_i, r_i) = \frac{1}{\pi} F_t(\eta_o, r_o) R_d(\|p_i - p_o\|) F_t(\eta_i, r_i) \end{cases} \tag{IV}$$

where $L_i$ is emissivity of the incident light, $L_o$ is emissivity of an emergent light, $p_i$ is a contact point between the incident light and an object, $p_o$ is a contact point between the emergent light and the object, $r_i$ is a direction vector of the incident light, $r_o$ is a direction vector of the emergent light, $\varphi_i$ is an included angle between the incident light and a normal vector of a micro-plane of the contact point, $S(p_o, r_o, p_i, r_i)$ is a bidirectional sub-surface reflection distribution function, $F_t$ is a Fresnel coefficient, $R_d$ is a diffusion approximation function, and d is a distance.

Further, a process of generating paired color image data and depth image data of the wave field in the step 1 is as follows:

step a, generating a two-dimensional image of the virtual wave field through adopting the data generation platform for the virtual wave field, and meanwhile, writing the minimum value of a depth in the same pixel into a depth cache;

step b, according to the depth value of the two-dimensional image of the virtual wave field, selecting a color closest to the camera to sequentially render the pixels, so as to generate a required color image of the virtual wave field; and step c, carrying out inverse perspective transformation on values in the depth cache, converting an image coordinate system into a world coordinate system to obtain a real depth value, and generating a required depth image of the virtual wave field.

Further, a specific process of the point cloud mapping algorithm in the step 6 is as follows:

step A, through translating a pixel coordinate system, translating the center point of the coordinate system from the top left corner of the image to the center of the image, and then multiplying by a conversion factor to convert the pixel coordinate system to the image coordinate system, as shown in a formula (V) below, $$\begin{cases} x = r_x \cdot \left(u - \frac{w}{2}\right) \\ y = r_y \cdot \left(v - \frac{h}{2}\right) \end{cases} \tag{V}$$

wherein uv is the pixel coordinate system, the origin is the top left corner of the image, w and h are pixel values of a width and a height of the image respectively, o-xy is the image coordinate system, the origin is the center point of the image, $r_x$ and $r_y$ are conversion factors, and represent absolute distances represented by a transversal pixel and a longitudinal pixel of the image respectively, and a calculation formula is shown in a formula (VI) below, $$\begin{cases} r_x = \frac{2f\tan\left(\frac{\beta}{2}\right)}{w} \\ r_y = \frac{2f\tan\left(\frac{\alpha}{2}\right)}{h} \end{cases} \tag{VI}$$

wherein α is an opening angle of a visual vertebrae of the camera in a vertical direction, β is an opening angle of the visual vertebrae of the camera in a horizontal direction, and f is a focal length of the camera;

step B, normalizing a vector (x, y, f) pointing from the optical center of the camera to the pixel point according to a formula (VII) below to obtain $(x_e, y_e, z_e)$ which represents a direction pointing from the optical center of the camera to a point in the image, and the direction is also a direction pointing from the optical center of the camera to a real point in the world coordinate system:

$$\begin{cases} x_e = \frac{x}{\sqrt{x^2 + y^2 + f^2}} \\ y_e = \frac{y}{\sqrt{x^2 + y^2 + f^2}} \\ z_e = \frac{z}{\sqrt{x^2 + y^2 + f^2}} \end{cases} \tag{VII}$$

step C, multiplying the vector $(x_e, y_e, z_e)$ with the distance between the optical center of the camera, which is stored in the depth image, and the point in the world coordinate system, so as to obtain a position of a point in the camera coordinate system with the optical center of the camera as the origin, as shown in a formula (VIII) below $$\begin{cases} x_C = d(u, v) \cdot x_e \\ y_C = d(u, v) \cdot y_e \, . \\ z_C = d(u, v) \cdot z_e \end{cases} \tag{VIII}$$

The advantages or beneficial effects of the present invention are that:

1) through introducing virtual wave field data to achieve the purpose of data obtaining, and using unsupervised learning for connecting virtual data and real data, a technical framework for water surface wave field perception, which is feasible and capable of being implemented under existing technological means is proposed;

2) with regard to the problem of difficulty in obtaining true values of water surface wave field data, a large amount of virtual wave field data may be generated for an algorithm for training through using Gerstner wave superposition for simulating a shape of the wave field, using a method of compounding a plurality of illumination models for simulating optical features of the wave field, and using rendering pipelines for generating the required color image data and depth image data, so that the purpose of training dataset obtaining is achieved;

3) a relationship between the color image and the depth image is regarded as an image translation problem, so that the problem of "edge blur" caused due to manual setting for a loss function in traditional monocular depth estimation is avoided;

4) the problem of projection occlusion of the wave field is considered in the process of generating the images of the virtual wave field by the built data generation platform for the virtual wave field, so that reliability and authenticity of wave field reconstruction are ensured; and 5) the method has no special requirements on a water body, and is high in adaptability, and moreover, a speed of the wave field reconstruction achieves millisecond class, and real-time wave field reconstruction may be carried out in outdoor water areas.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4A is a color image of the virtual wave field, and FIG. 4B is a depth image of the virtual wave field;

FIG. 6A is the input of the domain converter module, that is, a real water surface image, and FIG. 6B is the output of the domain converter module, that is, an image with a virtual-water-surface style;

FIG. 7A is the input of the depth estimation module, that is, an image with a virtual-water-surface style, and FIG. 7B is the output of the depth estimation module, that is, a depth image with a virtual-water-surface style; FIG. 8A and FIG. 8B are the input of a point cloud mapping module, that is, an image with a virtual-water-surface style and a depth image with a virtual-water-surface style, and FIG. 8C is the output of the point cloud mapping module, that is, a point cloud data image of the wave field.

DESCRIPTION OF THE EMBODIMENTS

The technical solution of the present invention will be further described below in combination with the drawings of the specification.

Figure 1:
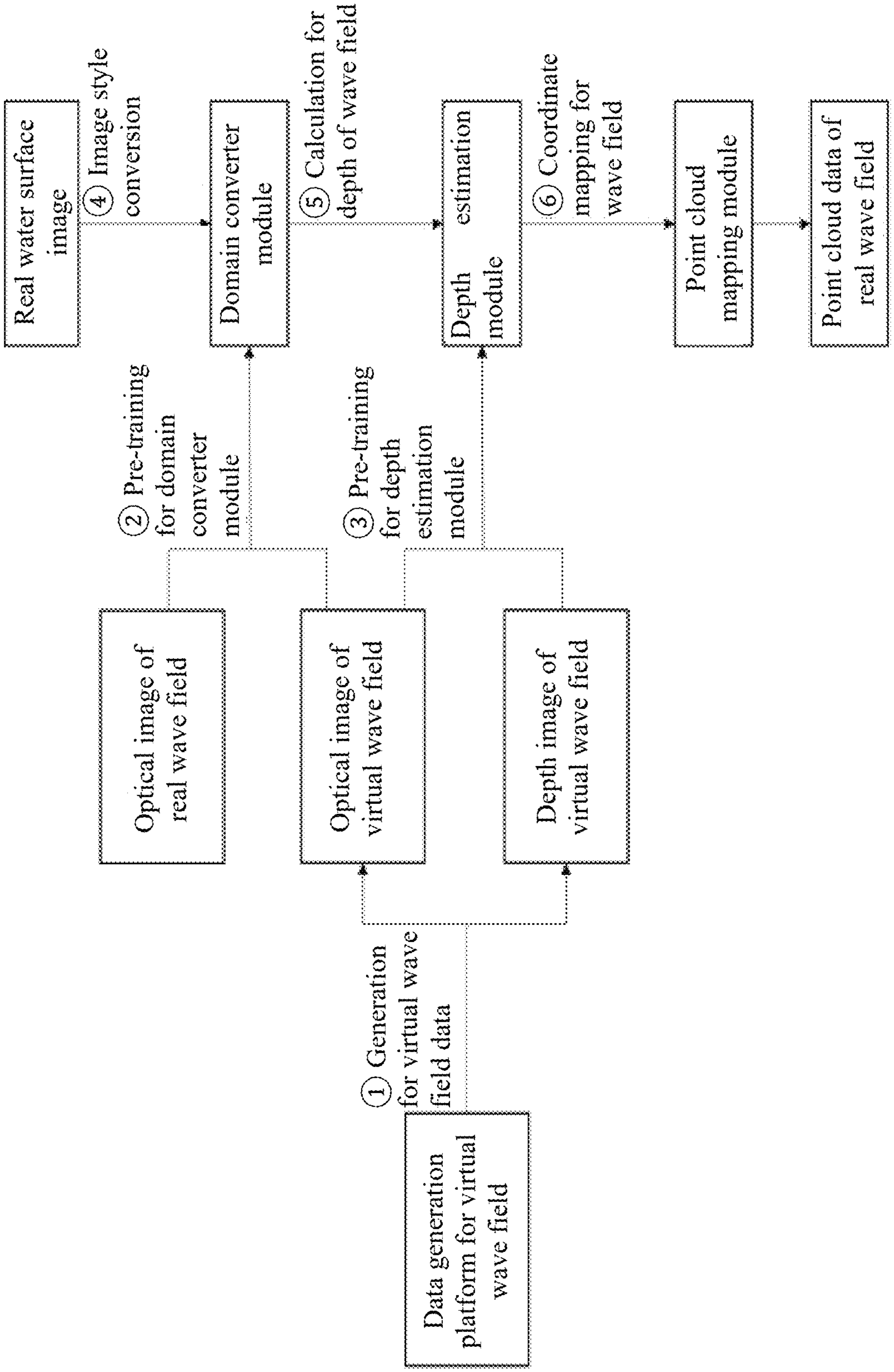
FIG. 1 is a schematic flow diagram of a wave field reconstruction method based on optical perception, of the present invention.
Figure 2:
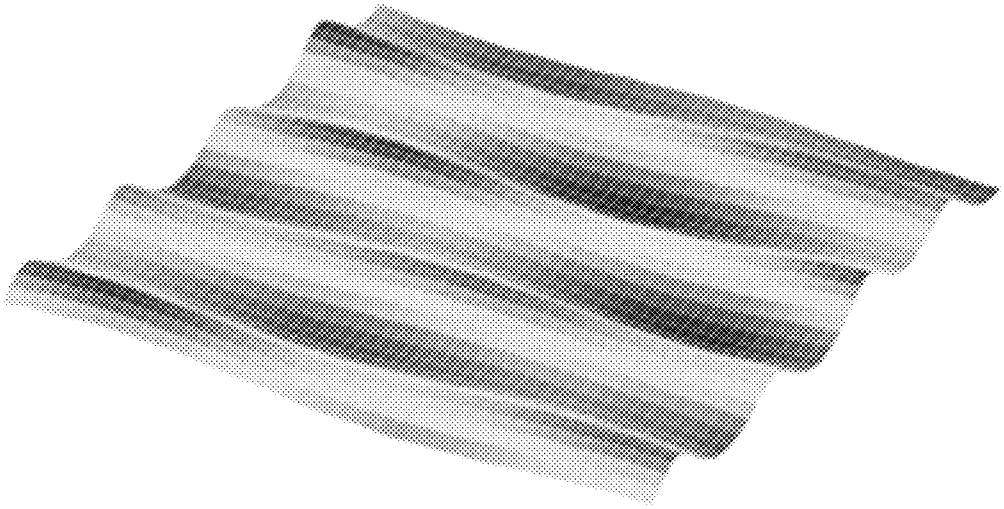
FIG. 2 is a schematic diagram of Gerstner wave superposition simulation under different wave conditions.

As shown in FIG. 1, specific steps of a wave field reconstruction method based on optical perception, of the present invention, are as follows:

step 1, building a data generation platform for a virtual wave field. A shape model and an optical model of a virtual wave field are built respectively through using a Unity development platform, and images of the virtual wave field are generated by means of a Unity engine. The Unity is a real-time 3D interactive content creation and operation platform that provides a whole set of comprehensive software solution for services including game development, art, architecture, automobile design, and film and television, and may be used for creating, operating, and monetizing any real-time interactive 2D and 3D content. A shape of the wave field is simulated through using Gerstner wave superposition to obtain height information and normal information of each point, optical features of a water surface are simulated through using composite illumination models, color brightness of each point is calculated by means of Gerstner wave output information, and color image rendering is carried out according to the brightness information to generate paired color image data and depth image data of the virtual wave field, and specific steps are as follows:

value ranges of parameters of the models are $Q_i \in [0,1]$, $k_i \in [0,512]$, $\theta_i \in [0,2\pi]$ and, $\omega_i \in [0,20]$. As shown in FIG. 2, in the example, n is taken to be equal to 6, that is, there is superposition of six groups of waveforms, where values of $Q_i$ are all 1, values of t and $\varphi_i$ are all 0, values of $\theta_i$ are 0.187, 0.867, 1.590, 0.006, 2.625, and 1.328 respectively, values of $A_i$ are 0.1, 0.2, 0.5, 0.01, 0.01, and 0.01 respectively, values of $k_i$ are 0.125, 0.25, 0.5, 1, 2, and 4 respectively, and different Gerstner wave superpositions are generated through permutation and combination to simulate the shape of the wave field, where a Gerstner wave formula is as follows:

$$\begin{cases} x = x_0 + \sum_{i=1}^{n} Q_i\cos\theta_i A_i\sin[k_i(x_0\cos\theta_i + y_0\sin\theta_i) + \omega_i t + \varphi_i] \\ y = y_0 + \sum_{i=1}^{n} Q_i\sin\theta_i A_i\sin[k_i(x_0\cos\theta_i + y_0\sin\theta_i) + \omega_i t + \varphi_i] \\ z = z_0 + \sum_{i=1}^{n} A_i\cos[k_i(x_0\cos\theta_i + y_0\sin\theta_i) + \omega_i t + \varphi_i] \end{cases} \quad (I)$$

where t is time, (x, y, z) is a position at the time t, $(x_0, y_0, z_0)$ is a position at rest, $Q_i$ is a sharpness degree of a wave peak of the ith wave superposed, and has a value range of $$[0, \frac{1}{k_i A_i}],$$

Figure 3:
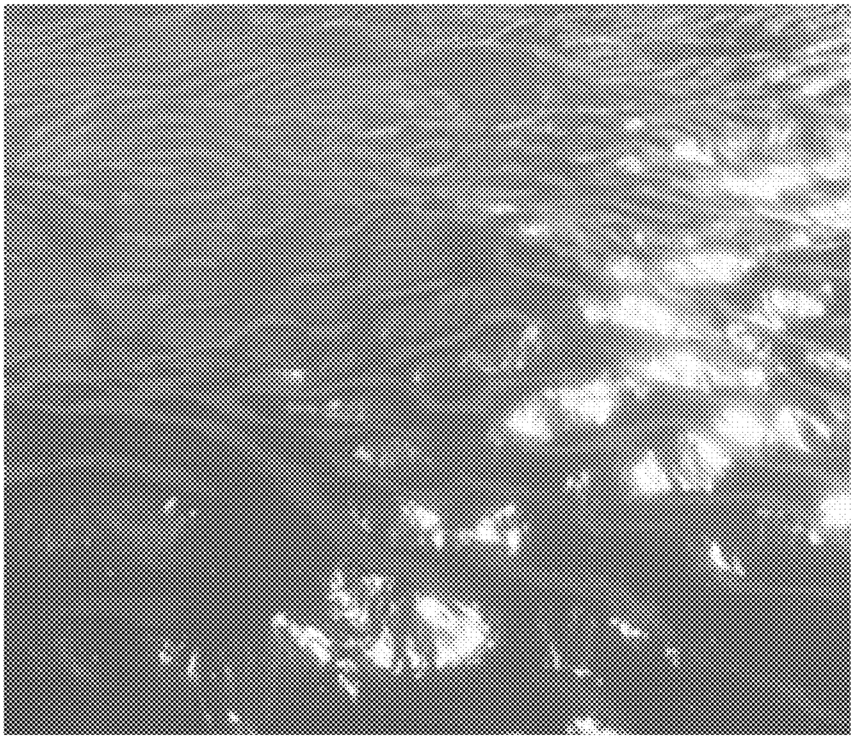
FIG. 3 is an effect diagram of a wave field added with a diffuse reflection model, a specular reflection model, and a sub-surface scattering model.

$A_i$ is an amplitude of the ith wave superposed, $k_i$ is a wave number of the ith wave superposed, $\theta_i$ is a direction angle of the ith wave superposed, $\omega_i$ is an angular speed of the ith wave superposed, and $\varphi_i$ is an initial phase of the ith wave superposed;

as shown in FIG. 3, the composite illumination models are a diffuse reflection model, a specular reflection model, and a sub-surface scattering model which are shown in a formula (II), a formula (III), and a formula (IV) below respectively, $$I_d = k_d I_{in} \cos\alpha \tag{II}$$

wherein $I_d$ is observed color brightness, $k_d$ is a diffuse reflectance coefficient, $I_{in}$ is brightness of incident light, and $\alpha$ is an included angle between a plane normal and the incident light;

$$I_m = k_m I_{in} (\cos(\phi - \theta))^n \tag{III}$$

where $I_m$ is observed color brightness, $k_m$ is a reflection coefficient, $I_{in}$ is the brightness of the incident light, $\phi$ is an included angle between a plane normal and the incident light, $\theta$ is an included angle between the plane normal and an observation line of sight, and n is a highlight coefficient; and $$\begin{cases} L_o(p_o, r_o) = \int\int S(p_o, r_o, p_i, r_i) L_i(p_i, r_i) |\cos\varphi_i| \, dr_i dA \\ S(p_o, r_o, p_i, r_i) = \frac{1}{\pi} F_t(\eta_o, r_o) R_d(\|p_i - p_o\|) F_t(\eta_i, r_i) \end{cases} \tag{IV}$$

where $L_i$ is emissivity of the incident light, $L_o$ is emissivity of an emergent light, $p_i$ is a contact point between the incident light and an object, $p_o$ is a contact point between the emergent light and the object, $r_i$ is a direction vector of the incident light, $r_o$ is a direction vector of the emergent light, $\varphi_i$ is an included angle between the incident light and a normal vector of a micro-plane of the contact point, $S(p_o, r_o, p_i, r_i)$ is a bidirectional sub-surface reflection distribution function, $F_t$ is a Fresnel coefficient, $R_d$ is a diffusion approximation function, and d is a distance.

Figure 4A:
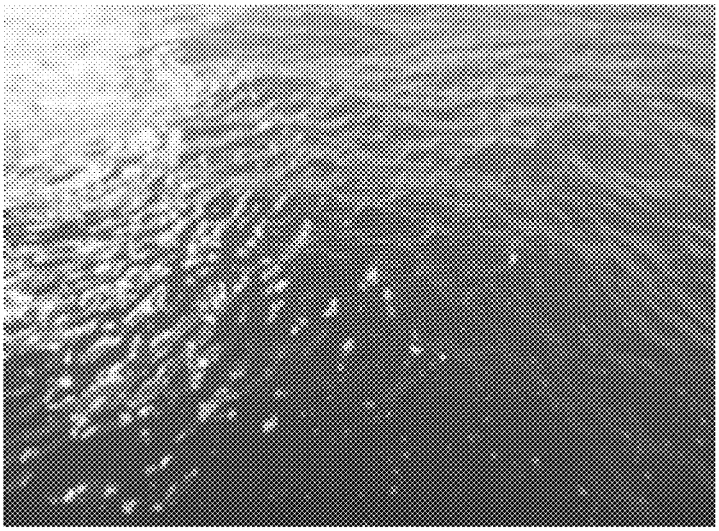
FIG. 4A and FIG. 4B are rendered images of the virtual wave field, where
Figure 4B:
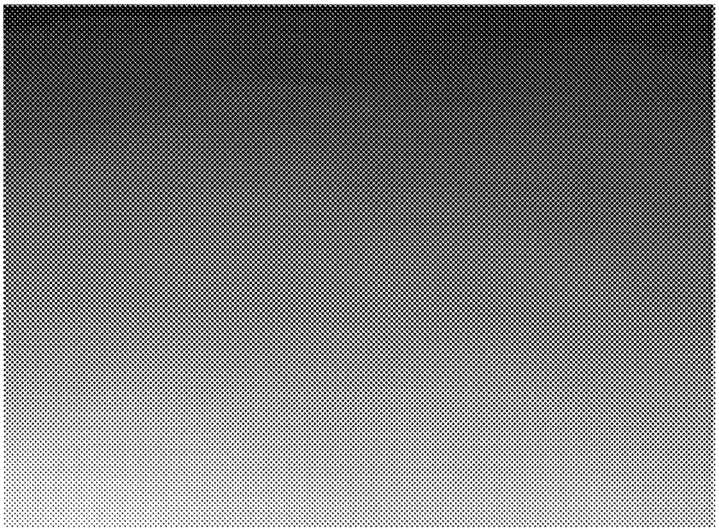

A final brightness value of the point is obtained through superposing the color brightness values calculated by the three groups of illumination models. A process of generating paired color image data and depth image data of the wave field is as follows:

step a, generating a two-dimensional image of the virtual wave field through adopting the data generation platform for the virtual wave field, and meanwhile, writing the minimum value of a depth in the same pixel into a depth cache;

step b, according to the depth value of the two-dimensional image of the virtual wave field, carrying out a rendering process by means of a Unity rendering function, and according to calculation results of the composite illumination models, selecting a color closest to the camera to sequentially render the pixels, so as to generate a required color image of the virtual wave field, as shown in FIG. 4A; and step c, carrying out inverse perspective transformation on values in the depth cache, converting an image coordinate system into a world coordinate system to obtain a real depth value, and generating a required depth image of the virtual wave field, as shown in FIG. 4B.

Step 2, constructing a domain converter module, and carrying out pre-training. The domain converter module, also known as an image style conversion technology, is a technology that converts an image into a new image with the same content but containing other styles, and usually adopts Dual Gan, Cycle Gan, Pix2Pix, and SSIM-Gan models. An existing Cycle Gan model of Pytorch software is adopted in the method of the present invention, the real water surface image captured by the camera, and the color image of the virtual wave field, which is generated in the step 1, are specifically adopted as the training set of the model, style transfer from the real water surface image to the virtual water surface image is learned, a network is composed of a generator I and a discriminator I, where in the example, a structure of the generator I is an encoder composed of two convolutional layers, a converter composed of nine Resnet blocks, and a decoder composed of anti-convolutional layers and one convolutional layer, a PatchGAN network is adopted for the discriminator I, and a structure of the discriminator I is a feature extractor I composed of four convolutional layers, and a classifier I composed of one convolutional layer.

Step 3, constructing a depth estimation module, and carrying out pre-training. Depth estimation is a computer vision task aimed at estimating a depth from a 2D image. The task requires inputting an RGB image and outputting the depth image, the depth image includes information about a distance from a viewpoint to an object in the image, and the viewpoint is usually the camera for capturing the image. An existing Pix2Pix model of Pytorch software is adopted in the patent, the paired color image data and depth image data of the virtual wave field, which are generated in the step 1 are specifically adopted as the training set, transformation from the color image of the wave field to the depth image is learned, the model is composed of a generator II and a discriminator II, where in the example, a U-Net model is adopted for the generator II, in the example, the U-Net model is composed of four convolutional and anti-convolutional layers, meanwhile, a skip connection is added between the symmetric convolutional layers, a PatchGAN network is adopted for the discriminator II, and a structure of the discriminator II is a feature extractor II composed of four convolutional layers, and a classifier II composed of one convolutional layer.

Figure 6A:
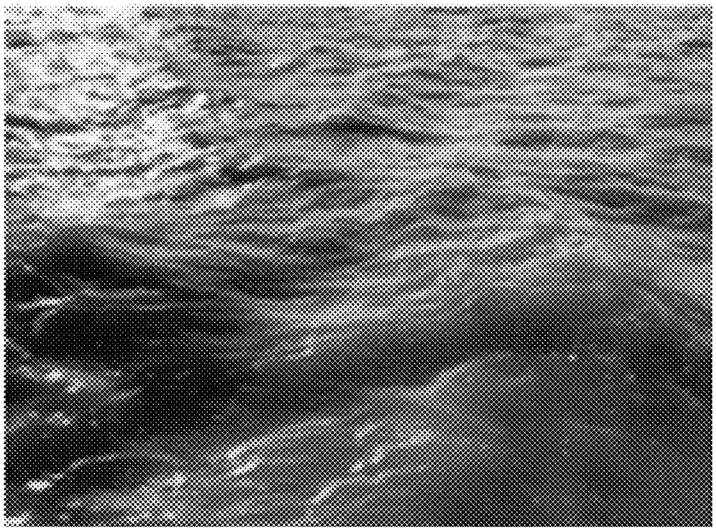
FIG. 6A and FIG. 6B are schematic diagrams of input and output of a domain converter module, where
Figure 6B:

Step 4, as shown in FIG. 6A and FIG. 6B, capturing a real water surface image, and converting the real water surface image into an image with a virtual-water-surface style through using the domain converter module.

Figure 7A:
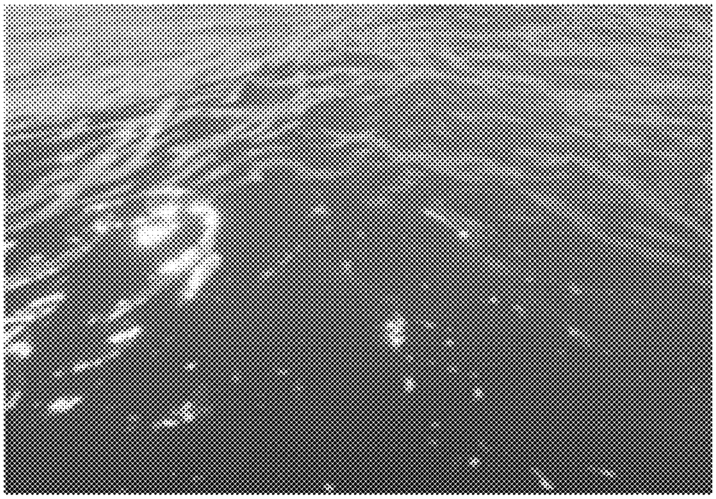
FIG. 7A and FIG. 7B are schematic diagrams of input and output of a depth estimation module, where
Figure 7B:
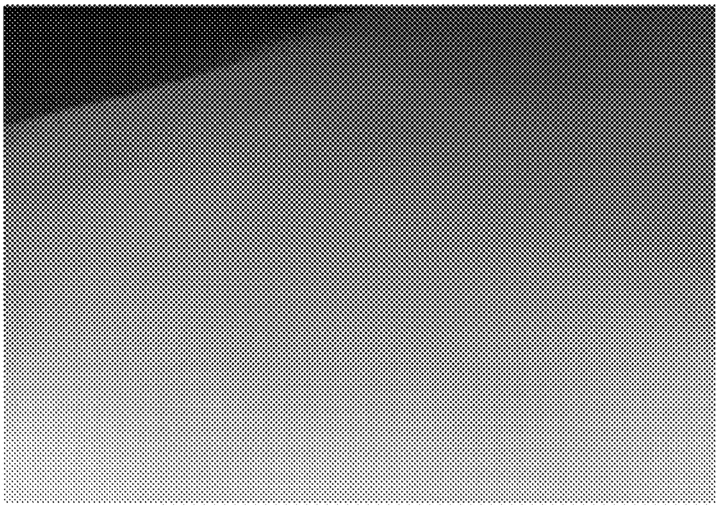

Step 5, as shown in FIG. 7A and FIG. 7B, inputting the converted image with the virtual-water-surface style, outputting the depth image with the virtual-water-surface style and recording a distance between a wave surface sampling point and an optical center of the camera through using the depth estimation module.

Figure 5:
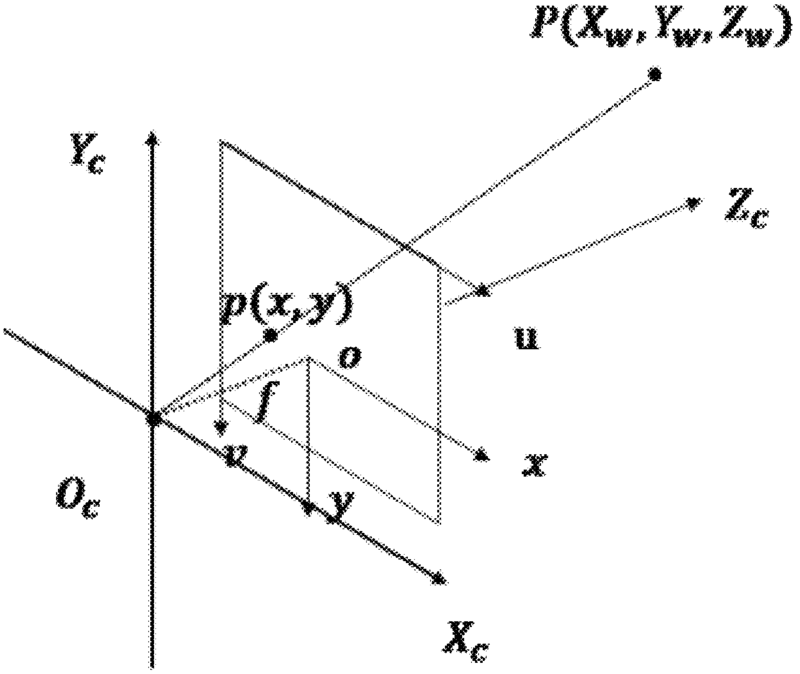
FIG. 5 is a schematic diagram of coordinate mapping of a camera.
Figure 8A:
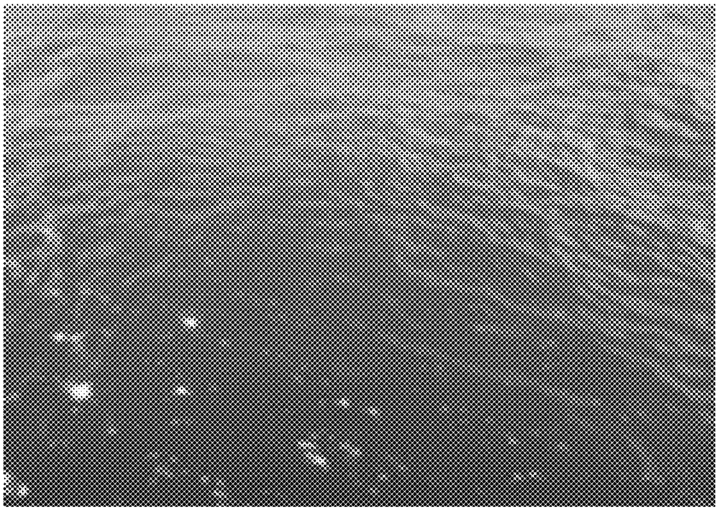
FIG. 8A to FIG. 8C are schematic diagrams of input data and output data of a point cloud mapping algorithm, where
Figure 8B:
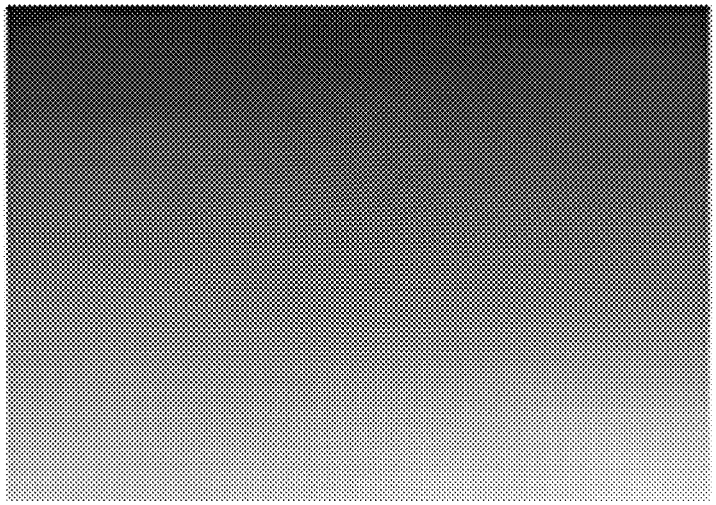
Figure 8C:
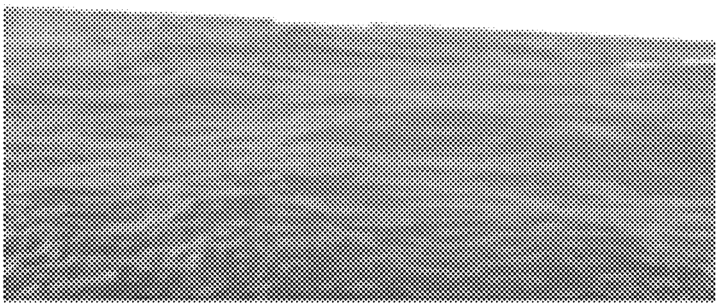

Step 6, as shown in FIG. 8A to FIG. 8C, carrying out coordinate mapping on the depth image with the virtual-water-surface style through adopting a point cloud mapping algorithm module, where a schematic diagram of coordinate mapping of the camera is shown in FIG. 5, and generating surface point cloud data that takes the optical center of the camera as a coordinate origin, of a water surface wave field, where specific steps are as follows:

step A, through translating a pixel coordinate system, translating the center point of the coordinate system from the top left corner of the image to the center of the image, and then multiplying by a conversion factor to convert the pixel coordinate system to the image coordinate system, as shown in a formula (V) below, $$\begin{cases} x = r_x \cdot \left(u - \frac{w}{2}\right) \\ y = r_y \cdot \left(v - \frac{h}{2}\right) \end{cases} \tag{V}$$

wherein uv is the pixel coordinate system, the origin is the top left corner of the image, w and h are pixel values of a width and a height of the image respectively, o-xy is the image coordinate system, the origin is the center point of the image, $r_x$ and $r_y$ are conversion factors, and represent absolute distances represented by a transversal pixel and a longitudinal pixel of the image respectively, and a calculation formula is shown in a formula (VI) below, $$\begin{cases} r_x = \dfrac{2f\tan\left(\frac{\beta}{2}\right)}{w} \\ r_y = \dfrac{2f\tan\left(\frac{\alpha}{2}\right)}{h} \end{cases} \tag{VI}$$

wherein α is an opening angle of a visual vertebrae of the camera in a vertical direction, β is an opening angle of the visual vertebrae of the camera in a horizontal direction, and f is a focal length of the camera;

step B, normalizing a vector (x, y, f) pointing from the optical center of the camera to the pixel point according to a formula (VII) below to obtain ($x_e$, $y_e$, $z_e$) which represents a direction pointing from the optical center of the camera to a point in the image, and the direction is also a direction pointing from the optical center of the camera to a real point in the world coordinate system:

$$\begin{cases} x_e = \dfrac{x}{\sqrt{x^2 + y^2 + f^2}} \\ y_e = \dfrac{y}{\sqrt{x^2 + y^2 + f^2}} \\ z_e = \dfrac{z}{\sqrt{x^2 + y^2 + f^2}} \end{cases} \tag{VII}$$

step C, multiplying the vector ($x_e$, $y_e$, $z_e$) with the distance between the optical center of the camera, which is stored in the depth image, and the point in the world coordinate system, so as to obtain a position of a point in the camera coordinate system with the optical center of the camera as the origin, as shown in a formula (VIII) below $$\begin{cases} x_C = d(u, v) \cdot x_e \\ y_C = d(u, v) \cdot y_e \, . \\ z_C = d(u, v) \cdot z_e \end{cases} \tag{VIII}$$

Via the above steps, three-dimensional reconstruction for waves may be realized through the water surface image captured by the camera, and the point cloud data of the water surface wave field is obtained.

Although the present invention has been disclosed above as the preferred examples, the examples are not intended to limit the present invention. Any equivalent variations or embellishments made without departing from the spirit and scope of the present invention are also within the protection scope of the present invention. Therefore, the protection scope of the present invention should be based on the contents defined by the claims of the present invention.

What is claimed is:

1. A wave field reconstruction method based on optical perception, comprising the following steps:

step 1, building a data generation platform for a virtual wave field, simulating optical features of a water surface through using composite illumination models, and generating paired color image data and depth image data of the virtual wave field;

step 2, constructing a domain converter module, and pre-training the constructed domain converter module through taking the color image data of the virtual wave field, and real water surface image data captured by a camera as a training set;

step 3: constructing a depth estimation module, and pre-training the constructed depth estimation module through taking the generated paired color image data and depth image data of the virtual wave field as a training set;

step 4: capturing a real water surface image, and converting a style of the real water surface image into an image with a virtual-water-surface style through using the domain converter module pre-trained in the step 2;

step 5, outputting the image with the virtual-water-surface style as a depth image with the virtual-water-surface style and recording a distance between a wave surface sampling point and an optical center of the camera through using the depth estimation module; and step 6: carrying out coordinate mapping on the depth image with the virtual-water-surface style through adopting a point cloud mapping algorithm, and generating surface point cloud data that takes the optical center of the camera as a coordinate origin, of a water surface wave field.

2. The wave field reconstruction method based on the optical perception according to claim 1, wherein the data generation platform for the virtual wave field in the step 1 is built through adopting a Gerstner wave model, and the Gerstner wave model is shown in a formula (I) below, $$\begin{cases} x = x_0 + \sum_{i=1}^{n} Q_i \cos\theta_i A_i \sin[k_i(x_0\cos\theta_i + y_0\sin\theta_i) + \omega_i t + \varphi_i] \\ y = y_0 + \sum_{i=1}^{n} Q_i \sin\theta_i A_i \sin[k_i(x_0\cos\theta_i + y_0\sin\theta_i) + \omega_i t + \varphi_i] \\ z = z_0 + \sum_{i=1}^{n} A_i \cos[k_i(x_0\cos\theta_i + y_0\sin\theta_i) + \omega_i t + \varphi_i] \end{cases} \tag{I}$$

wherein t is time, (x, y, z) is a position at the time t, ($x_0$, $y_0$, $z_0$) is a position at rest, $Q_i$ is a sharpness degree of a wave peak of the ith wave superposed, and has a value range of $$\left[0, \frac{1}{k_i A_i}\right],$$

$A_i$ is an amplitude of the ith wave superposed, $k_i$ is a wave number of the ith wave superposed, $\theta_i$ is a direction angle of the ith wave superposed, $\omega_i$ is an angular speed of the ith wave superposed, and $\varphi_i$ is an initial phase of the ith wave superposed.

3. The wave field reconstruction method based on the optical perception according to claim 2, wherein the composite illumination models in the step 1 are a diffuse reflection model, a specular reflection model, and a sub-surface scattering model which are shown in a formula (II), a formula (III), and a formula (IV) below respectively, $$I_d = k_d I_{in} \cos\alpha \tag{II}$$

wherein $I_d$ is observed color brightness, $k_d$ is a diffuse reflectance coefficient, $I_{in}$ is brightness of incident light, and $\alpha$ is an included angle between a plane normal and the incident light;

$$I_m = k_m I_{in} (\cos(\phi - \theta))^n \tag{III}$$

wherein $I_m$ is observed color brightness, $k_m$ is a specular reflection coefficient, $I_{in}$ is the brightness of the incident light, $\phi$ is an included angle between the plane normal and the incident light, $\theta$ is an included angle between the plane normal and an observation line of sight, and n is a highlight coefficient; and $$\begin{cases} L_o(p_o, r_o) = \int\int S(p_o, r_o, p_i, r_i) L_i(p_i, r_i) |\cos\varphi_i| \, dr_i dA \\ S(p_o, r_o, p_i, r_i) = \frac{1}{\pi} F_t(\eta_o, r_o) R_d(\|p_i - p_o\|) F_t(\eta_i, r_i) \end{cases} \tag{IV}$$

wherein $L_i$ is emissivity of the incident light, $L_o$ is emissivity of an emergent light, $p_i$ is a contact point between the incident light and an object, $p_o$ is a contact point between the emergent light and the object, $r_i$ is a direction vector of the incident light, $r_o$ is a direction vector of the emergent light, $\varphi_i$ is an included angle between the incident light and a normal vector of a micro-plane of the contact point, S($p_o$, $r_o$, $p_i$, $r_i$) is a bidirectional sub-surface reflection distribution function, $F_t$ is a Fresnel coefficient, $R_d$ is a diffusion approximation function, and d is a distance.

4. The wave field reconstruction method based on the optical perception according to claim 3, wherein a process of generating paired color image data and depth image data of the wave field in the step 1 is as follows:

step a, generating a two-dimensional image of the virtual wave field through adopting the data generation platform for the virtual wave field, and meanwhile, writing the minimum value of a depth in the same pixel into a depth cache;

step b, according to the depth value of the two-dimensional image of the virtual wave field, selecting a color closest to the camera to sequentially render the pixels, so as to generate a required color image of the virtual wave field; and step c, carrying out inverse perspective transformation on values in the depth cache, converting an image coordinate system into a world coordinate system to obtain a real depth value, and generating a required depth image of the virtual wave field.

5. The wave field reconstruction method based on the optical perception according to claim 1, wherein a specific process of the point cloud mapping algorithm in the step 6 is as follows:

step A, through translating a pixel coordinate system, translating the center point of the coordinate system from the top left corner of the image to the center of the image, and then multiplying by a conversion factor to convert the pixel coordinate system to the image coordinate system, as shown in a formula (V) below, $$\begin{cases} x = r_x \cdot \left(u - \frac{w}{2}\right) \\ y = r_y \cdot \left(v - \frac{h}{2}\right) \end{cases} \tag{V}$$

wherein uv is the pixel coordinate system, the origin is the top left corner of the image, w and h are pixel values of a width and a height of the image respectively, o-xy is the image coordinate system, the origin is the center point of the image, $r_x$ and $r_y$ are conversion factors, and represent absolute distances represented by a transversal pixel and a longitudinal pixel of the image respectively, and a calculation formula is shown in a formula (VI) below, $$\begin{cases} r_x = \frac{2f \tan\left(\frac{\beta}{2}\right)}{w} \\ r_y = \frac{2f \tan\left(\frac{\alpha}{2}\right)}{h} \end{cases} \tag{VI}$$

wherein $\alpha$ is an opening angle of a visual vertebrae of the camera in a vertical direction, $\beta$ is an opening angle of the visual vertebrae of the camera in a horizontal direction, and f is a focal length of the camera;

step B, normalizing a vector (x, y, f) pointing from the optical center of the camera to the pixel point according to a formula (VII) below to obtain ($x_e$, $y_e$, $Z_e$) which represents a direction pointing from the optical center of the camera to a point in the image, and the direction is also a direction pointing from the optical center of the camera to a real point in the world coordinate system:

$$\begin{cases} x_e = \frac{x}{\sqrt{x^2 + y^2 + f^2}} \\ y_e = \frac{y}{\sqrt{x^2 + y^2 + f^2}} \\ z_e = \frac{z}{\sqrt{x^2 + y^2 + f^2}} \end{cases} \tag{VII}$$

step C, multiplying the vector ($x_e$, $y_e$, $z_e$) with the distance between the optical center of the camera, which is stored in the depth image, and the point in the world coordinate system, so as to obtain a position of a point in the camera coordinate system with the optical center of the camera as the origin, as shown in a formula (VIII) below $$\begin{cases} x_C = d(u, v) \cdot x_e \\ y_C = d(u, v) \cdot y_e \\ z_C = d(u, v) \cdot z_e \end{cases}. \tag{VIII}$$

* * * * *